US011662855B1

(12) United States Patent
Sorensen et al.

(10) Patent No.: US 11,662,855 B1
(45) Date of Patent: May 30, 2023

(54) SYSTEM AND METHOD FOR ADJUSTING INPUT POLLING RATE IN GAMING INPUT DEVICES

(71) Applicant: Backbone Labs, Inc., Vancouver, WA (US)

(72) Inventors: Eric Sorensen, Portland, OR (US); Maneet Singh Khaira, Portland, OR (US); Zachary Scott, Palo Alto, CA (US); Samuel Boegli, Beaverton, OR (US)

(73) Assignee: BACKBONE LABS, INC., Vancouver, WA (US)

( * ) Notice: Subject to any disclaimer, the term of this patent is extended or adjusted under 35 U.S.C. 154(b) by 0 days.

(21) Appl. No.: 17/987,772

(22) Filed: Nov. 15, 2022

(51) Int. Cl.
*G09G 5/00* (2006.01)
*G06F 3/041* (2006.01)
*A63F 13/24* (2014.01)

(52) U.S. Cl.
CPC .......... *G06F 3/04166* (2019.05); *A63F 13/24* (2014.09)

(58) Field of Classification Search
CPC ...... G06F 3/04166; A63F 13/20; A63F 13/23; A63F 13/24; A63F 13/92
See application file for complete search history.

(56) References Cited

U.S. PATENT DOCUMENTS

| | | | | |
|---|---|---|---|---|
| 6,238,289 B1* | 5/2001 | Sobota | ................... | A63F 13/73 463/36 |
| 6,640,268 B1* | 10/2003 | Kumar | ................... | G06F 13/366 710/15 |
| 6,684,062 B1* | 1/2004 | Gosior | ................... | A63F 13/843 455/66.1 |
| 8,462,810 B2* | 6/2013 | Spinar | ................... | H04W 72/23 370/468 |
| 2006/0236002 A1* | 10/2006 | Valenci | ................... | H04L 69/28 710/48 |
| 2009/0077277 A1* | 3/2009 | Vidal | ................... | G06F 1/3253 710/46 |
| 2010/0067424 A1* | 3/2010 | Sun | ................... | H04W 72/1215 370/311 |
| 2010/0115050 A1* | 5/2010 | Sultenfuss | ................... | H04L 67/52 709/217 |
| 2014/0024392 A1* | 1/2014 | Su | ................... | H04W 4/029 455/456.2 |
| 2016/0180811 A1* | 6/2016 | Colenbrander | ........ | A63F 13/355 356/402 |

* cited by examiner

*Primary Examiner* — Joe H Cheng
(74) *Attorney, Agent, or Firm* — Miller Nash LLP

(57) ABSTRACT

A gaming input device implements a method of adjusting input polling rate in various usage scenarios to optimize performance in light of scenario-specific considerations. The device detects a usage scenario and maps it to an optimized input polling rate, then requests the optimized input polling rate from associated firmware and hardware so an adjustment can be accomplished. The automated adjustment to polling rate accounts for problems associated with various usage scenarios, such as latency and power consumption, and allows for optimization specific to each scenario.

20 Claims, 3 Drawing Sheets

SYSTEM AND METHOD FOR ADJUSTING INPUT POLLING RATE IN GAMING INPUT DEVICES

TECHNICAL FIELD

The subject matter is related to a method for adjusting the input polling of a gaming input device rate based on context and usage of the device, and, more particularly, to a method for detecting a usage scenario, mapping the scenario to an appropriate polling rate, and adjusting the polling rate on the device.

BACKGROUND

Gaming input devices, such as handheld gaming controllers, typically operate using fixed input polling rates. This means the rate at which a gaming input device communicates to the host that something has changed (e.g., that a button has been pushed or that a joystick has been moved) is preset and cannot be adjusted. These polling rates are typically set by way of compromise. Fast polling is most desirable to reduce overall input latency, but as polling rate increases, so does power consumption of the device. And for wireless products, input signals may become more susceptible to interference at higher polling rates. Consequently, polling rates are typically chosen to balance these issues across a variety of usage scenarios. But such compromise means fixed rates are not optimal for every usage scenario.

A common usage scenario is running a game directly from a user's device, whether that be from a console, the user's personal computer, or the user's mobile device. In this scenario, a game is stored and executed locally on the user's device, which requires a large amount of power from the device. High input polling rates contribute even further to a device's power consumption, so it is often desirable to lower the polling rate in the specific context of games run locally. Accordingly, power consumption is a significant consideration in selecting an input polling rate.

Another usage scenario that has seen growing popularity is cloud gaming, which allows users to game via subscription without needing access to physical consoles. In cloud gaming, users run games on remote servers that then stream to the users' devices (personal computers, mobile phones, etc.). Because a user's input must be sent across a network to the servers hosting the game, network latency issues can affect game performance. Low input polling rates can worsen these latency issues, so higher input polling rates are often more desirable in the context of cloud gaming. Accordingly, latency is a significant consideration in setting an input polling rate.

With fixed input polling rates, gaming input devices cannot optimize for both the power consumption problems associated with running games locally and the latency problems associated with cloud gaming. Rather, they must implement polling rates that meet the two problems somewhere in the middle and allow some incidental negative effects to remain when the devices are used in either context. As a result, users must accept that an input device will consume excess power when used for local gaming or will encounter latency obstacles when used for cloud gaming.

Products have been created that allow users to manually adjust input polling rates to account for the problems described. However, manual adjustment requires a user to understand the various problems associated with polling rates, how those problems present themselves in different contexts, and how to appropriately address them. Furthermore, manual adjustment, by nature, requires user intervention at any instance that an adjustment would be appropriate. Consequently, there is a need for adjustment to be automated to reduce the level of sophistication required and to improve overall effort and ease for the user.

Configurations of the disclosed technology address shortcomings in the prior art.

DETAILED DESCRIPTION

As described herein, aspects are directed to a method of automatically adjusting input polling rate on a gaming input device based on various usage scenarios. Accordingly, in configurations the usage scenario is dynamically detected and the input polling rate is automatically adjusted, all without user intervention. Instead, the user may continue to enjoy the game the user is playing without needing to concern themselves with tuning the input polling rate. This enhances the user experience in at least two ways: by taking the task of adjusting the polling rate out of the hands of the user and by setting the gaming input device to an appropriate input polling rate based on the usage scenario. The user need not be educated in what input polling rate might be best for a given usage scenario, and the user need not be educated in how to set the gaming input device to that input polling rate. Aspects are now described in more detail.

Figure 1:
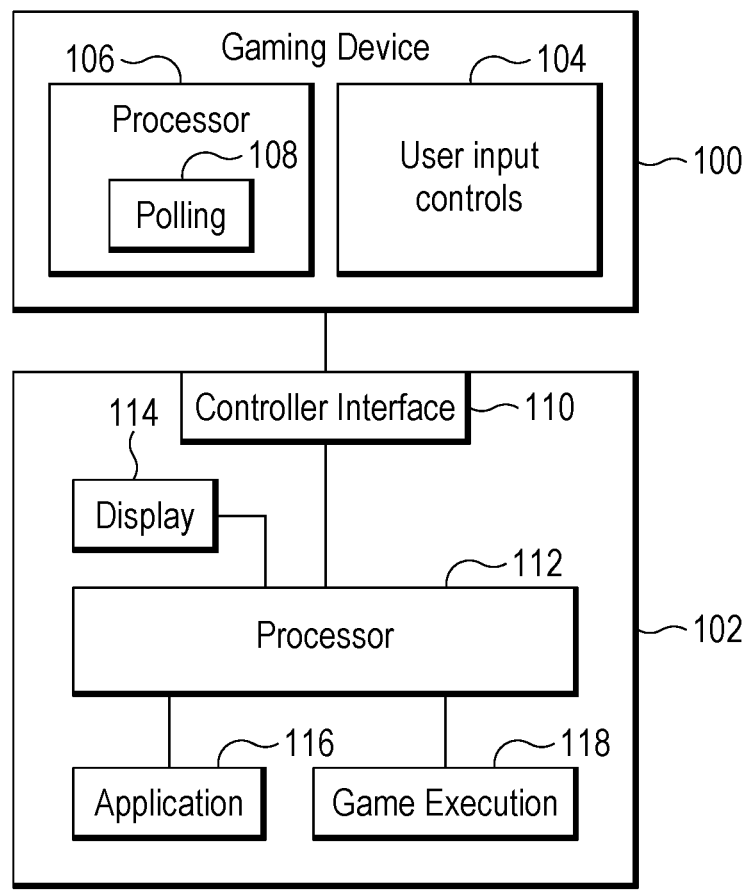
FIG. 1 is a functional block diagram of a system for adjusting input polling rate, according to an example configuration.

FIG. 1 is a functional block diagram of a system for adjusting polling rate, according to an example configuration. The system includes a gaming input device 100, such as a game controller, and a computing device 102. In an example configuration, the computing device 102 is a mobile device, such as a smartphone, laptop computer, tablet, or other type of mobile device. The gaming input device 100 may further include a processor 106 having a polling function 108 and user input controls 104. The gaming input device 100 may be, for example, the game controller for a mobile device as disclosed in U.S. Pat. No. 11,389,721.

As illustrated in FIG. 1, the computing device 102 may include a processor 112 and a display 114. The processor 112 executes an operating system of the computing device 102. The gaming input device 100 may be connected to the computing device 102 through a controller interface 110. When interfacing with the computing device 102, the gaming input device 100 may utilize the processor 112, the operating system, and the display 114 of the computing device 102 and may have access to data that is available to the processor 112 of the computing device 102. Such configurations provide the advantage of allowing the gaming input device 100 to access and utilize data, functionality, and results of the computing device 102.

In the illustrated configuration, an application 116 associated with the gaming input device 100 may be downloaded to the computing device 102, enabling the user to run games via one of multiple game execution modes 118, such as cloud gaming, locally-run gaming, or that no gaming application is running. Through the application 116, a usage scenario may be detected, and an optimized polling rate may be mapped to a control signal or command that is communicated to the gaming input device 100 to adjust the polling rate of the gaming input device 100. The detected usage scenario may be the game execution mode 118, and may also include the identity of the game (i.e. what game is being played).

Figure 2:
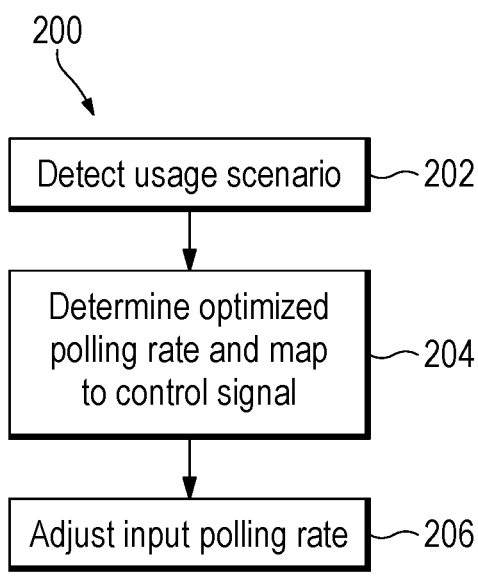
FIG. 2 is a flowchart of the operations for adjusting input polling rate, according to an example configuration.

FIG. 2 is a flowchart showing portions of a system 200 for adjusting a polling rate according to an example configuration. As illustrated in FIG. 2, the system 200 may include three components, or blocks, for carrying out the polling rate adjustment. In the first block 202, a processor detects a usage scenario, which may include, as examples, cloud gaming, local gaming, and non-gaming. In an example configuration, detection of a usage scenario is made by a processor, such as the processor 112 of FIG. 1, running an application on a user's mobile device, the mobile device being connected to a gaming input device that interfaces with the mobile device and utilizes its operating system. The mobile application may detect, for example, that a user is playing a game, what the particular game is, and that the game is running locally on the mobile device. As another example, the mobile application may detect that a particular game is being streamed to the mobile device via a cloud gaming service.

In the second block 204 as illustrated in FIG. 2, the detected scenario is mapped to a control signal or command for an optimized polling rate. The optimized polling rate accounts for problems associated with particular usage scenarios, such as power consumption and end-to-end latency. In other words, in configurations the optimized polling rate is determined by evaluating whether the input polling rate should be increased or decreased based on available information regarding power consumption and end-to-end latency. Such information may be in the form of data that is available to the processor 112 of the computing device 102 that includes the power consumption level or the end-to-end latency period, or both. In the scenario of cloud gaming, for example, end-to-end latency refers to network delay between a user sending input to a host server and receiving the server response back. That delay can be measured by the computing device 102 and be available to the processor 112 of the computing device 102. At lower polling rates, the less frequent input may be aggravated by poor network connection, leading to significant response delays from host servers and poorer game performance. As a result, selecting a higher input polling rate is optimal in the cloud gaming scenario. Conversely, in the local usage scenario, end-to-end latency is less of a concern because the device does not rely on communication over a network. But a linear relationship exists between radio frequency power consumption and input polling rate; higher polling rates lead to greater power consumption. As a result, selecting a lower input polling rate is optimal in the local gaming scenario. In configurations, the mapping to an optimized polling rate may be determined by utilizing a lookup table.

As illustrated, at the second block 204 the processor ultimately creates a signal or generates a command to be received by a processor to adjust the polling rate at the third block 206. The polling rate can be adjusted in several ways. In one example method, the controller interface 110 between the gaming device 100 and the computing device 102 can be adjusted. Depending on the nature of that interface, the gaming device 102 can request a faster update rate/shorter communications interval, or it may simply push updates at a faster rate, depending on which element controls the interface (i.e. whether it is the gaming device 100 or the computing device 102). In a second example method, the gaming device 100 increases the polling rate of the user input controls 104. In some cases, the application 116 requests that the gaming input device 300 increase the polling rate between the gaming device 300 and the cloud gaming server 306.

Figure 4:
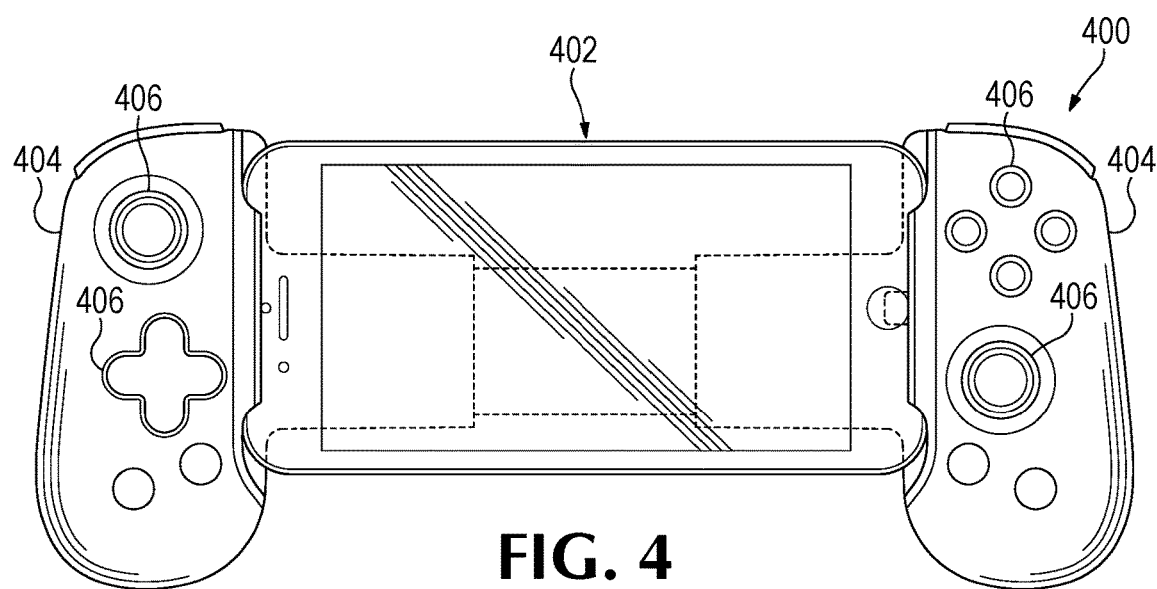
FIG. 4 illustrates an example gaming input device connected to an example computing device.

For gaming input devices that are separate devices from the computing device or other mobile device, such as the gaming input device 400 of FIG. 4, typically the processor creating the signal or generating the command in the block 204 of FIG. 2 is the processor 112 of the computing device 102 of FIG. 1, while the processor that receives the signal or command is typically the processor 106 of the gaming input device 100 of FIG. 1. Accordingly, the input polling rate of the gaming input device 100 for such configurations means the rate at which the gaming input device 100 communicates to the computing device 102 that an input has been received by the user input controls 104.

In the third block 206 depicted in FIG. 2, the processor adjusts the gaming input device's polling rate. In example configurations, a signal or command is given via Bluetooth or other radio frequency (RF) protocol to either reduce or increase the gaming input device's polling rate to match the rate determined to be optimal in the second block. In other example configurations, the signal or command is sent to the gaming input device through a wired connection between the computing device and the gaming input device. By way of example and not limitation, polling rates are typically on the order of milliseconds, such as between about one millisecond and about twenty milliseconds.

Figure 3:
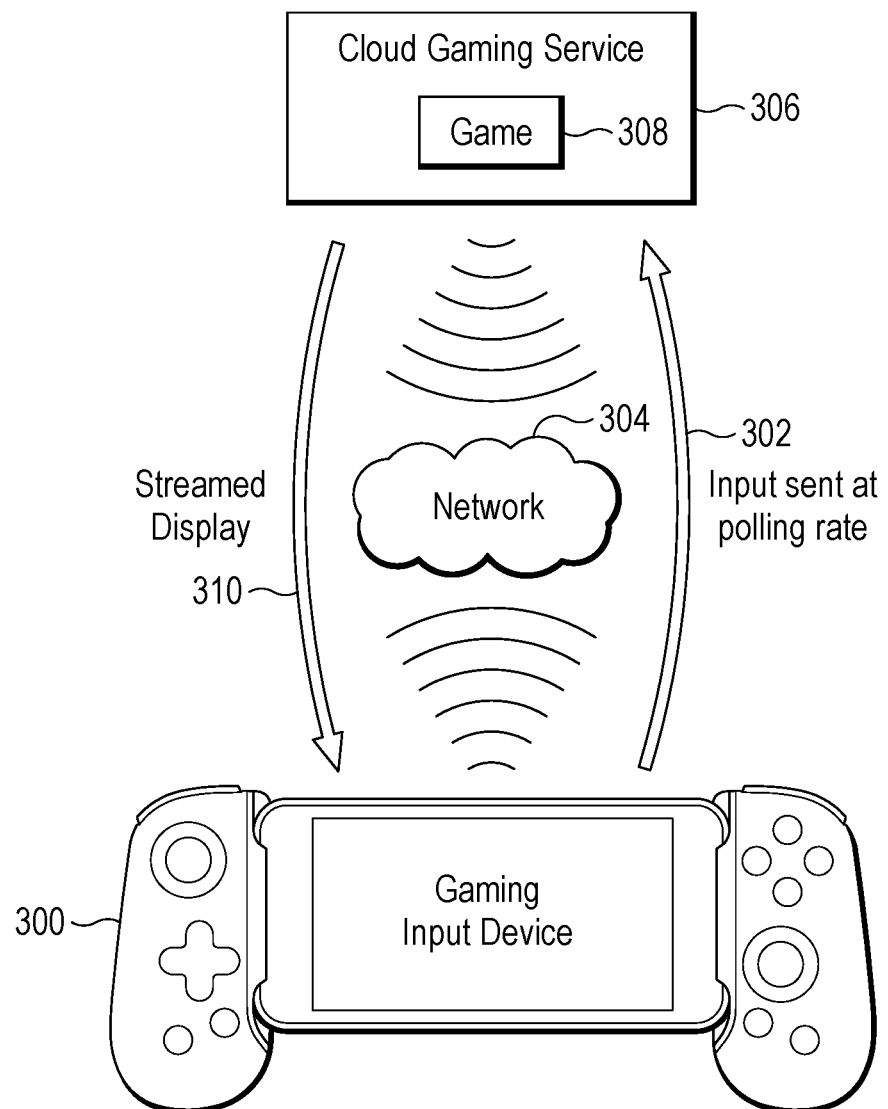
FIG. 3 is an illustration of an example cloud-gaming environment.

FIG. 3 illustrates an example environment for adjusting input polling rate in cloud gaming, according to an example configuration. In the configuration illustrated in FIG. 3, a gaming input device 300 sends user input 302 at a polling rate over a network 304. The network 304 communicates the user input 302 to a cloud gaming server 306, wherein a game 308 is stored and run. The server 306, then streams a display 310 of the game back to the user at the gaming input device 300. The gaming input device 300 of FIG. 3 may be the gaming input device 100 as described above for FIG. 1. As noted, in other configurations, the game play may be local, meaning that the game is stored and run locally, typically by the computing device 102.

FIG. 4 illustrates an example of a gaming input device 400 connected to an example computing device 402. The gaming input device 400 of FIG. 4 may be the gaming input device 100 as described above for FIG. 1 or the gaming input device 300 as described above for FIG. 3, each capable of having its input polling rate adjusted as described in connection with FIG. 2. As illustrated in FIG. 4, the game controller 400 may include handles 404. Each handle 404 in the example configuration includes user-accessible, hardware interfaces 406, such as one or more of a button, an analog stick, a touchscreen, a touchpad, a knob, a slider, a switch, a wheel, a dial, a directional pad, or another such feature configured to accept touch inputs from a user's finger or a stylus. The user-accessible, hardware interface 406 may be the user input controls 104 as described above for FIG. 1.

Figure 5:
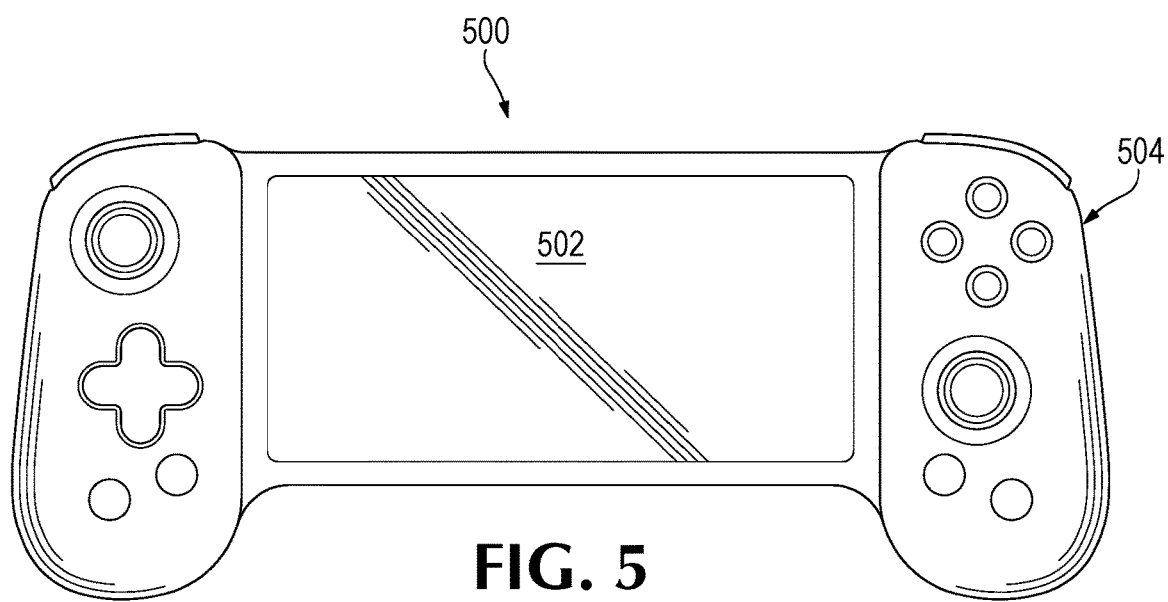
FIG. 5 illustrates an example gaming input device having a display screen integrated into a handheld controller.

In another example configuration, such as illustrated in FIG. 5, the integrated gaming input device 500 comprises a display screen 502 integrated into a handheld controller 504 and does not require interfacing with a user's mobile device. Specifically, in this configuration the device 500 utilizes its own operating system and other software to perform the methods as described above for FIG. 2. In other words, the functions and features of the computing device 102 illustrated in FIG. 1 may be integrated into the gaming input device 100 in some configurations. In such configurations (and with reference back to FIG. 2), a processor within the integrated gaming input device 500 detects a usage scenario in the first block 202. In the second block 204 of FIG. 2, the detected scenario is mapped to a control signal or command for an optimized polling rate as described above for FIG. 2. In the third block 206 depicted in FIG. 2, the processor adjusts the polling rate of the integrated gaming input device 500.

Accordingly, the input polling rate of the integrated gaming input device 500 means the rate at which the integrated gaming input device 500 communicates to the cloud gaming server 306 (see FIG. 3) that an input has been received by the user input controls 104.

Otherwise, the gaming input device 500 may have the features and be used as described above for the gaming input device 100 of FIG. 1, the gaming input device 300 of FIG. 3, or the gaming input device 400 of FIG. 4.

EXAMPLES

Illustrative examples of the disclosed technologies are provided below. A particular configuration of the technologies may include one or more, and any combination of, the examples described below.

Example 1 includes method of automatically adjusting an input polling rate for a gaming input device, comprising: detecting, by a processor, a usage scenario of the gaming input device; determining, by the processor, an optimized polling rate for the detected usage scenario; and causing, by the processor, the input polling rate of the gaming input device to be automatically adjusted in accordance with the optimized polling rate.

Example 2 includes the method of Example 1, in which the causing the input polling rate of the gaming input device to be automatically adjusted includes receiving, as an input to the gaming input device, a control signal from the processor corresponding to the optimized polling rate.

Example 3 includes the method of any of Examples 1-2, in which the processor is in a mobile device interfacing with the gaming input device.

Example 4 includes the method of any of Examples 1-2, in which the processor is in the gaming input device, the gaming input device comprising a display screen integrated with a handheld controller.

Example 5 includes the method of any of Examples 1-4, in which the determining the optimized polling rate involves evaluating, by the processor, end-to-end latency data, and in which adjusting the input polling rate is increasing the input polling rate.

Example 6 includes the method of any of Examples 1-4, in which the determining the optimized polling rate involves evaluating, by the processor, power consumption levels, and in which adjusting the input polling rate is decreasing the input polling rate.

Example 7 includes non-transitory, computer-readable medium having computer-executable instructions stored thereon that, in response to execution by a computing device, cause the computing device to perform operations, the operations comprising: detecting a usage scenario of a gaming input device; determining an optimized polling rate for the detected usage scenario; and causing an input polling rate of the gaming input device to be automatically adjusted in accordance with the optimized polling rate.

Example 8 includes the computer-readable medium of Example 7, in which the causing the input polling rate of the gaming input device to be automatically adjusted includes sending, to the gaming input device, a control signal corresponding to the optimized polling rate.

Example 9 includes the computer-readable medium of any of Examples 7-8, in which the computing device is a mobile device interfacing with the gaming input device.

Example 10 includes the computer-readable medium of any of Examples 7-8, in which the computing device is in the gaming input device, the gaming input device comprising a display screen integrated with a handheld controller.

Example 11 includes the computer-readable medium of any of Examples 7-10, in which determining an optimized polling rate includes evaluating end-to-end latency data, and in which adjusting the input polling rate is increasing the input polling rate.

Example 12 includes the computer-readable medium of any of Examples 7-10, in which determining an optimized polling rate involves accounting for power consumption issues, and in which adjusting the input polling rate is decreasing the input polling rate.

Example 13 includes system comprising: a handheld game controller; and a processor programmed to: detect a usage scenario of the handheld game controller; determine an optimized polling rate for the detected usage scenario; cause an input polling rate of the handheld game controller to be automatically adjusted in accordance with the optimized polling rate.

Example 14 includes the system of Example 13, in which the processor is in a mobile device interfacing with the handheld game controller.

Example 15 includes the system of any of Examples 13-14, in which the processor is further programmed to send a control signal to the handheld game controller, the control signal corresponding to the optimized polling rate.

Example 16 includes the system of any of Examples 13-14, in which the processor is in the handheld game controller, the handheld game controller comprising a display screen.

Example 17 includes method of adjusting an input polling rate for a handheld game controller without user intervention, comprising: detecting, by a processor, a usage scenario of the handheld game controller; determining, by the processor, an optimized polling rate for the usage scenario; and adjusting the input polling rate of the handheld game controller automatically in accordance with the optimized polling rate.

Example 18 includes the method of Example 17, in which the processor is in a mobile device interfacing with the handheld game controller.

Example 19 includes the method of any of Examples 17-18, the method further comprising sending, by the processor, a control signal to the handheld game controller, the control signal corresponding to the optimized polling rate.

Example 20 includes the method of any of Examples 17 or 19, in which the processor is in the handheld game controller.

Aspects may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various configurations. In addition, the functionality may be embodied in whole or in part in firmware or hardware equivalents such as integrated circuits, field programmable gate arrays (FPGA), and the like. Particular data structures may be used to more effectively implement one or more aspects of the disclosed systems and methods, and such data structures are contemplated within the scope of computer executable instructions and computer-usable data described herein.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific example configurations have been described for purposes of illustration, it will be understood that various modifications may be made without departing from the spirit and scope of the disclosure.

We claim:

1. A method of automatically adjusting an input polling rate for a gaming input device, comprising:
   detecting, by a processor, a usage scenario of the gaming input device;
   determining, by the processor, an optimized polling rate for the detected usage scenario; and
   causing, by the processor, the input polling rate of the gaming input device to be automatically adjusted in accordance with the optimized polling rate.

2. The method of claim 1, in which the causing the input polling rate of the gaming input device to be automatically adjusted includes receiving, as an input to the gaming input device, a control signal from the processor corresponding to the optimized polling rate.

3. The method of claim 1, in which the processor is in a mobile device interfacing with the gaming input device.

4. The method of claim 1, in which the processor is in the gaming input device, the gaming input device comprising a display screen integrated with a handheld controller.

5. The method of claim 1, in which the determining the optimized polling rate involves evaluating, by the processor, end-to-end latency data, and in which adjusting the input polling rate is increasing the input polling rate.

6. The method of claim 1, in which the determining the optimized polling rate involves evaluating, by the processor, power consumption levels, and in which adjusting the input polling rate is decreasing the input polling rate.

7. A non-transitory, computer-readable medium having computer-executable instructions stored thereon that, in response to execution by a computing device, cause the computing device to perform operations, the operations comprising:
   detecting a usage scenario of a gaming input device;
   determining an optimized polling rate for the detected usage scenario; and
   causing an input polling rate of the gaming input device to be automatically adjusted in accordance with the optimized polling rate.

8. The computer-readable medium of claim 7, in which the causing the input polling rate of the gaming input device to be automatically adjusted includes sending, to the gaming input device, a control signal corresponding to the optimized polling rate.

9. The computer-readable medium of claim 7, in which the computing device is a mobile device interfacing with the gaming input device.

10. The computer-readable medium of claim 7, in which the computing device is in the gaming input device, the gaming input device comprising a display screen integrated with a handheld controller.

11. The computer-readable medium of claim 7, in which determining an optimized polling rate includes evaluating end-to-end latency data, and in which adjusting the input polling rate is increasing the input polling rate.

12. The computer-readable medium of claim 7, in which determining an optimized polling rate involves accounting for power consumption issues, and in which adjusting the input polling rate is decreasing the input polling rate.

13. A system comprising:
   a handheld game controller; and
   a processor programmed to:
      detect a usage scenario of the handheld game controller;
      determine an optimized polling rate for the detected usage scenario;
      cause an input polling rate of the handheld game controller to be automatically adjusted in accordance with the optimized polling rate.

14. The system of claim 13, in which the processor is in a mobile device interfacing with the handheld game controller.

15. The system of claim 13, in which the processor is further programmed to send a control signal to the handheld game controller, the control signal corresponding to the optimized polling rate.

16. The system of claim 13, in which the processor is in the handheld game controller, the handheld game controller comprising a display screen.

17. A method of adjusting an input polling rate for a handheld game controller without user intervention, comprising:
   detecting, by a processor, a usage scenario of the handheld game controller;

determining, by the processor, an optimized polling rate for the usage scenario; and adjusting the input polling rate of the handheld game controller automatically in accordance with the optimized polling rate.

18. The method of claim 17, in which the processor is in a mobile device interfacing with the handheld game controller.

19. The method of claim 17, the method further comprising sending, by the processor, a control signal to the handheld game controller, the control signal corresponding to the optimized polling rate.

20. The method of claim 17, in which the processor is in the handheld game controller.

* * * * *